United States Patent [19]

Windle

[11] Patent Number: 4,883,411
[45] Date of Patent: Nov. 28, 1989

[54] WAVE POWERED PUMPING APPARATUS AND METHOD

[76] Inventor: Tom J. Windle, 3500 Southeast Washington Blvd., Bartlesville, Okla. 74006

[21] Appl. No.: 239,618

[22] Filed: Sep. 1, 1988

[51] Int. Cl.[4] .................. F04B 17/00; F03B 13/12
[52] U.S. Cl. ................................ 417/331; 60/497; 290/53
[58] Field of Search .............. 417/331, 332, 333; 60/495, 496, 497, 501, 504, 505, 506, 507; 290/42, 53

[56] References Cited

U.S. PATENT DOCUMENTS

| | | |
|---|---|---|
| 831,679 | 9/1906 | Pray et al. |
| 961,401 | 6/1910 | Bonney |
| 1,516,349 | 12/1924 | Rittenhouse |
| 3,030,893 | 4/1962 | Shaffer |
| 3,040,667 | 6/1962 | Shaffer |
| 3,126,830 | 3/1964 | Dilliner ............................ 417/331 |
| 3,289,592 | 12/1966 | Franzreb ...................... 417/331 X |
| 3,487,228 | 12/1969 | Kriegel ........................ 417/331 X |
| 3,930,168 | 12/1975 | Tornabene ......................... 290/53 |
| 4,076,463 | 2/1978 | Welczer ............................ 417/331 |
| 4,249,084 | 2/1981 | Villanueva et al. ................ 290/53 |
| 4,326,840 | 4/1982 | Hicks et al. ...................... 417/331 |
| 4,398,095 | 8/1983 | Ono .................................. 290/53 |
| 4,421,461 | 12/1983 | Hicks et al. ........................ 417/53 |
| 4,594,853 | 6/1986 | Raichlen et al. ............... 417/331 X |
| 4,739,182 | 4/1988 | Kenderi ......................... 290/53 X |
| 4,754,157 | 6/1988 | Windle ............................... 290/53 |

Primary Examiner—Leonard E. Smith
Attorney, Agent, or Firm—Laney, Dougherty, Hessin & Beavers

[57] ABSTRACT

A pumping apparatus and method for pumping fluid using energy from rising and falling wave action in a body of fluid includes at least one float; a primary pump, such as a piston pump, connectable to the float for pumping fluid as the float rises with rising wave action; a secondary pump, such as a piston pump, connectable to the float and connectable to a fluid container extending above the pumping apparatus; and at least one anchor connectable to at least one of the primary pump and the secondary pump for anchoring the primary pump and the secondary pump relative to the float. The primary pump is moved from a reloaded position to a discharged position as the float rises the rising wave action in order to pump fluid. The secondary pump pumps fluid into the fluid container as the float rises with rising wave action. The fluid pumped into the fluid container exerts a reloading pressure on the secondary pump in opposition to the buoyancy of the float which moves the secondary pump from an extended position to a retracted position as the float falls with falling wave action. The secondary pump is interconnected with the primary pump and moves the primary pump from the discharged position to the reloaded position as the float falls with falling wave action.

31 Claims, 4 Drawing Sheets

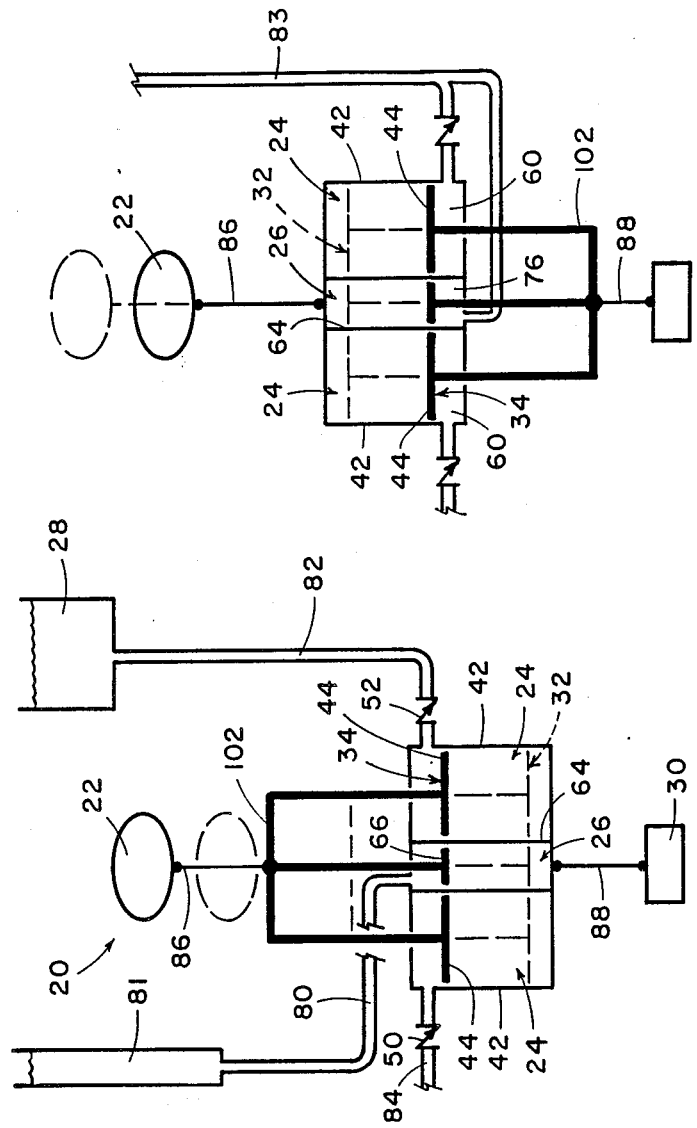

WAVE POWERED PUMPING APPARATUS AND METHOD

BACKGROUND OF THE INVENTION

This invention relates to devices which extract energy from wave action in a body of fluid. More particularly, it concerns the extraction of energy from wave action utilizing a float actuated pump.

Various types of devices which attempt to extract energy from wave action in a body of fluid or water have been known for some time. These devices have generally used some type of float to rise with rising wave action and various types of apparatus to reload, or pull the float down, as the float falls with falling wave action. Most of the prior devices are relatively elaborate pumping systems which use a complex multi-level arrangement of elevated reservoirs or chambers, piping, and valves to receive pumped fluid and reload the pumping device; or which use the weight of the float or pumping device itself to reload the pumping device, and which require the load-bearing support of the floor of the body of water to resist the downward force of the pumped fluid or weighted pumping device as the pumping device is reloaded. Other prior devices, which do not use the load-bearing support of the floor of the body of water to reload, use relatively complex arrangements of springs and pumps, weighted floats and springs, or a float to buoy the cylinder from the sea floor and a weighted float to both upstroke the piston and reload the piston. A drawback to the prior wave energy extraction devices is that they are relatively complex and expensive to maintain and manufacture. Since one of the main purposes of developing wave energy extraction devices is to reduce the cost of energy, the costs involved in maintaining and manufacturing the devices is important to the practicability of the devices. Thus, there is a need in the art for a wave energy extraction device which is inexpensive to manufacture and maintain.

SUMMARY OF THE INVENTION

It is an advantage of this invention to provide a wave activated pumping apparatus and method which is inexpensive to maintain and manufacture, even to the point of being expendable, i.e., if the device becomes inoperative, it can simply be replaced.

It is an advantage of the present invention to provide a wave activated pumping apparatus and method which use a portion of the energy captured or fluid pumped during rising wave action to reload or downstroke the pump during falling wave action.

It is an advantage of the present invention to provide a wave activated pumping apparatus and method which do not use the weight of the float or pumping apparatus to reload the pumping apparatus and thereby eliminates the inefficiencies and destructive forces present when a weighted float or pumping apparatus is not in proper alignment.

It is an advantage of the present invention to use two pumps, one pump which pumps fluid for energy capturing purposes during rising wave action and another pump which pumps fluid to be used to reload the pumping apparatus during falling wave action.

It is an advantage of the pumping apparatus and method of the present invention to require only one fluid container for pumped fluid; the fluid container being used for both storing pumped fluid and for providing fluid to reload the pumping apparatus.

It is an advantage of the present invention to provide a wave activated pumping apparatus and method which do not require access to land above or below the level of the body of fluid to install, operate, or maintain the apparatus.

It is an advantage of the present invention to utilize a portion of the pumped fluid to compensate for tide variations.

It is an advantage of the present invention to use a portion of the pumped fluid to maintain tension in the pumping apparatus which controls the motion of the pumping apparatus and enhances the efficiency of the apparatus.

Accordingly, the pumping apparatus of the present invention includes at least one float; primary pumping means connected to the float and connected to an anchor; and secondary pumping means connected to the float, connected to an anchor, and connected to a fluid container extending above the pumping apparatus. The primary pumping means is moved from a reloaded position to a discharged position as the float rises with rising wave action in order to pump fluid. The secondary pumping means pumps fluid into the fluid container as the float rises with rising wave action and moves the primary pumping means from the discharged position to the reloaded position as the float falls with falling wave action. The fluid in the fluid container exerts a reloading pressure in the secondary pumping means in opposition to the buoyancy of the float. The reloading pressure moves the secondary pumping means from an extended position to a retracted position as the float falls with falling wave action. The motion of the secondary pumping means as the float falls with falling wave action moves the primary pumping means from the discharged position to the reloaded position.

BRIEF DESCRIPTION OF THE DRAWINGS

The present invention will be better understood by reference to the examples of the following drawings:

FIG. 9 is a schematic diagram of another embodiment of the wave powered pumping apparatus of the present invention in which pumps are connected in series between the float and anchor;

FIG. 10 is a schematic diagram of an embodiment of the wave powered pumping apparatus of the present invention used to illustrate parallel or coaxial connection of pumps between the float and anchor; and FIG. 11 is a schematic diagram of another embodiment of the wave powered pumping apparatus of the present invention used to illustrate parallel or coaxial connection of pumps between the float and anchor.

DETAILED DESCRIPTION OF THE PREFERRED EMBODIMENTS

Before explaining the present invention in detail, it is to be understood that the invention is not limited to the details of construction and arrangement of parts illustrated in the accompanying drawings, since the invention is capable of other embodiments and of being practiced and carried out in various ways commensurate with the claims herein. Also, it is to be understood that the terminology employed herein is for the purpose of description and not of limitation.

FIGS. 1-11 present preferred embodiments of a pumping apparatus and method, generally designated 20, for pumping fluid using energy from rising and falling wave action in a body of fluid 21, such as a sea, lake, reservoir, tank, etc.

Common Features of FIGS. 1-11

Figure 1:
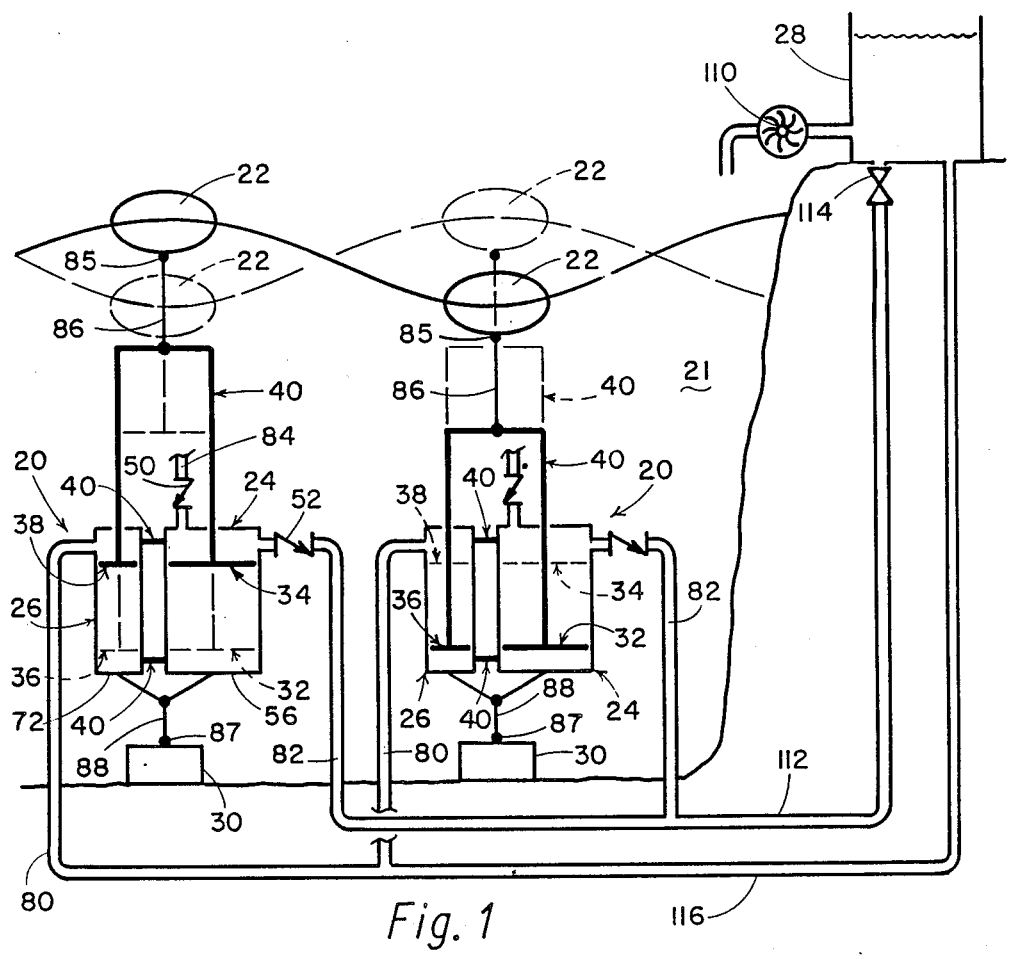
FIG. 1 is a schematic diagram of an applied use of the wave powered pumping apparatus of the present invention and a method of protecting the pumping apparatus from excessive wave action.
Figure 2:
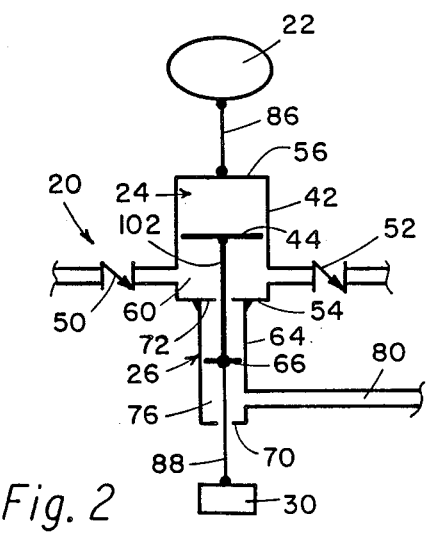
FIG. 2 is a schematic diagram of an embodiment of the wave powered pumping apparatus of the present invention in which pumps are connected in series between the float and anchor.
Figure 3:
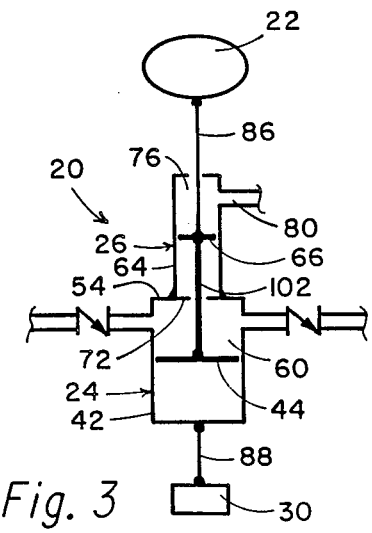
FIG. 3 is a schematic diagram of another embodiment of the wave powered pumping apparatus of the present invention in which pumps are connected in series between the float and anchor.
Figure 5:
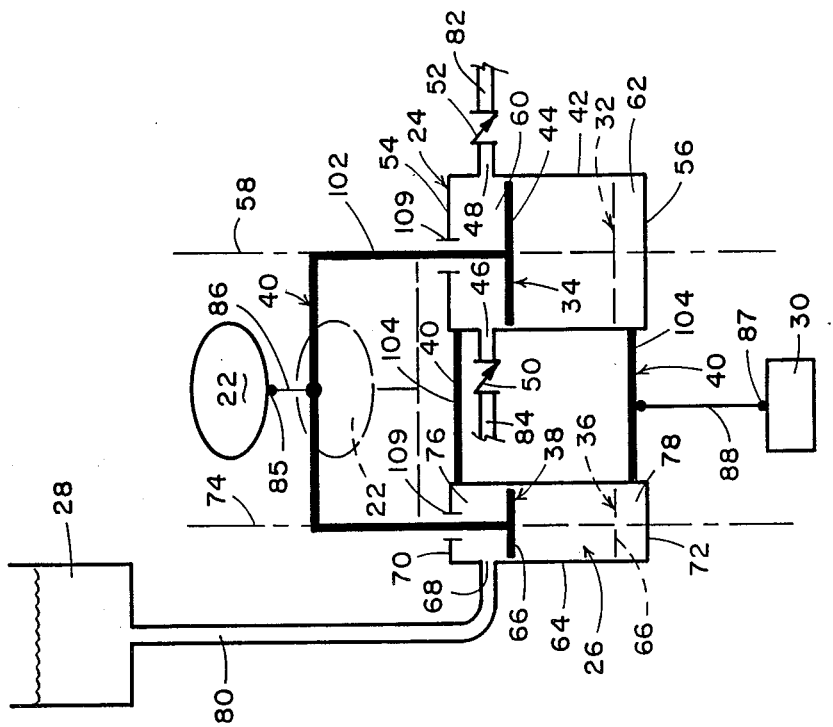
FIG. 5 is a schematic diagram of an embodiment of the wave powered pumping apparatus of the present invention in which pumps are connected in parallel between the float and anchor.
Figure 4:
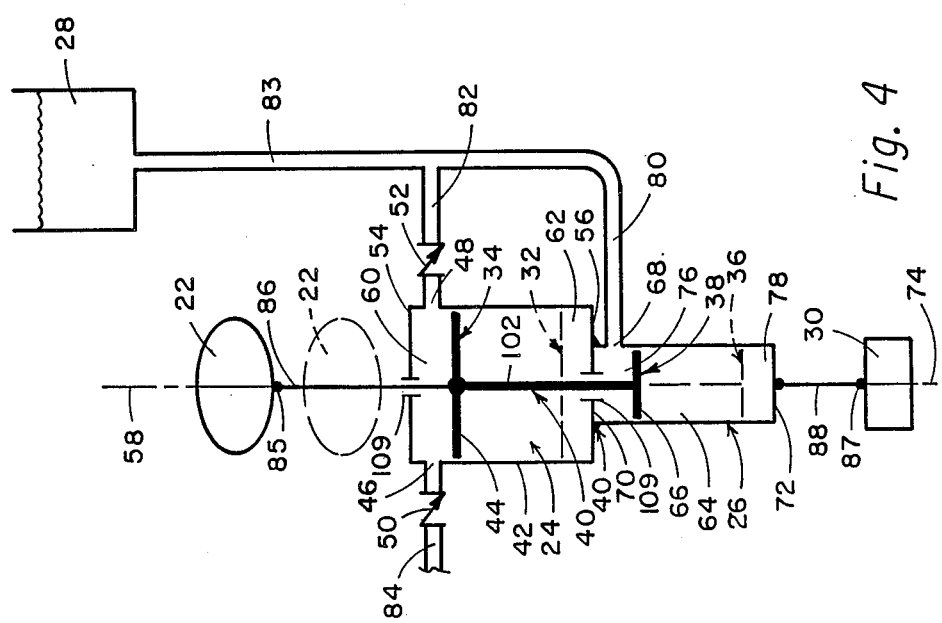
FIG. 4 is a schematic diagram of another embodiment of the wave powered pumping apparatus of the present invention in which pumps are connected in series between the float and anchor.

Referring to the example of FIGS. 1-11, and particularly FIGS. 1, 4, and 5 which are used to describe features common to all of the Figures, the pumping apparatus 20 may be generally described as being comprised of at least one float 22; primary pumping means, generally designated 24, connectable to the float 22 for pumping fluid as the float 22 rises with rising wave action; secondary pumping means, generally designated 26, connectable to the float 22 and connectable to a fluid container 28 extending above the pumping apparatus 20, for pumping fluid into the fluid container 28 and for reloading the primary pumping means 24 as the float 22 falls with falling wave action; and at least one anchor 30 connectable to at least one of the primary pumping means 24 and the secondary pumping means 26 for anchoring the primary and secondary pumping means 24, 26 relative to the float 22.

Referring to the example of FIG. 1, the primary pumping means 24 is moved from a reloaded position, generally designated 32, to a discharged position, generally designated 34, by the float 22 in order to pump fluid as the float 22 rises with rising wave action. The secondary pumping means 26 is moved from a retracted position generally designated 36, to an extended position, generally designated 38, in order to pump fluid into the fluid container 2S as the float rises with rising wave action. The fluid in the fluid container 2S exerts a reloading pressure in the secondary pumping means 26 in opposition to the buoyancy of the float 22. The reloading pressure moves the secondary pumping means 26 from the extended position 38 to the retracted (or reloaded) position 36 as the float 22 falls with falling wave action. This motion of the secondary pumping means 26 is used to move the primary pumping means 24 from the discharged position 34 to the reloaded position 32 as the float 22 falls with falling wave action. The secondary pumping means 26 utilizes interconnection means, generally designated 40, to transfer the motion of the secondary pumping means 26 to the primary pumping means 24 needed to move the primary means 24 from the discharged position 34 to the reloaded position 32. The interconnection means 40 is preferably a yoking arrangement, either directly between the pumping means 24, 26 or effected with the float 22 and anchor 30, as discussed infra.

The fluid pumped by the primary pumping means 24 and the energy contained therein may be used for any desired purpose, e.g., operating a hydroelectric generator placed in the discharge line from the primary pumping means 24 (not illustrated), and may be conducted through piping or conduit to any suitable location or elevation where the energy contained in the pumped fluid can be usefully employed by an end user. In the preferred embodiment, referring to the example of FIG. 1, the primary pumping means 24 pumps fluid into the fluid container 28 as the float 22 rises with rising wave action, as further discussed infra.

The primary and secondary pumping means 24, 26 may be virtually any type of fluid pumping devices, e.g., centrifugal pumps, positive displacement pumps, or equivalent fluid flow or fluid pressure activated devices which will accomplish the functions discussed herein. In the preferred embodiment, referring to the example of FIG. 1, the primary pumping means 24 is a piston pump 24 (referred to hereinafter as "primary piston pump") and the secondary pumping means 26 is a piston pump 26 (referred to hereinafter as "secondary piston pump").

Figure 6:
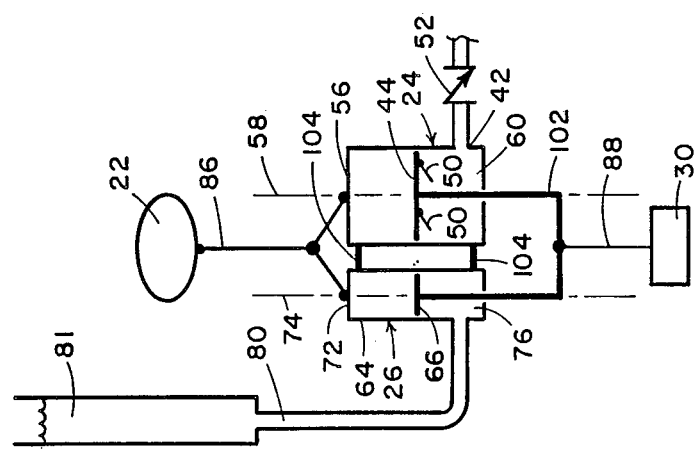
FIG. 6 is a schematic diagram of another embodiment of the wave powered pumping apparatus of the present invention in which pumps are connected in parallel between the float and anchor.

Referring to example FIGS. 4 and 5, the primary piston pump 24 includes a primary cylinder 42, a primary piston 44 reciprocally disposed in the primary cylinder 42, an inlet port 46, an outlet port 48, an inlet check valve 50, and an outlet check valve 52. The primary cylinder 42 has a first end 54, a second end 56, and a cylindrical axis 58 extending between the first end 54 and the second end 56. The primary piston 44 cooperates with the primary cylinder 42 to form a primary pumping chamber 60 between the primary piston 44 and the first end 54 of the primary cylinder 42 and to form a primary relief chamber 62 between the primary piston 44 and second end 56 of the primary cylinder 42. The primary piston 44 moves from the reloaded position 32 in which the primary pumping chamber 60 is of enlarged capacity to the discharged position 34 in which the primary pumping chamber 60 is of reduced capacity as the float 22 rises with rising wave action. The inlet port 46 extends through the primary piston pump 24 into the primary pumping chamber 60 for admitting fluid into the primary pumping chamber 60. The outlet port 48 extends through the primary piston pump 24 into the primary pumping chamber 60 for discharging fluid from the primary pumping chamber 60. The inlet port 46 and outlet port 48 may be located in the primary cylinder 42, as exemplified in FIGS. 4 and 5, or in the primary piston 44, as exemplified in FIG. 6, depending upon the configuration of the pumping apparatus 20, space and sizing considerations, and the layout of the pumping system into which the pumping apparatus 20 is to be installed. The inlet check valve 50 is connectable to the inlet port 46 and allows fluid to be admitted to the primary pumping chamber 60 while preventing discharge of fluid from the primary pumping chamber 60 through the inlet port 46. The outlet check valve 52 is connectable to the outlet port 4S and allows fluid to be pumped from the primary pumping chamber 60 through the outlet port 48 while preventing flow of fluid through the outlet port 48 into the primary pumping chamber 60. FIG. 6 presents an example embodiment in which the inlet port/inlet check valves 50 are located in the primary piston 44.

Referring to the example of FIGS. 4 and 5, the secondary piston pump 26 comprises a secondary cylinder 64, a secondary piston 66 reciprocally disposed in the secondary cylinder 64, and a bidirectional port 68. The secondary cylinder 64 has a first end 70, a second end 72, and a cylindrical axis 74 extending between the first end 70 and the second end 72. The secondary piston 66 cooperates with the secondary cylinder 64 to form a secondary pumping chamber 76 between the secondary piston 66 and the first end 70 of the secondary cylinder 64 and to form a secondary relief chamber 78 between the secondary piston 66 and the second end 72 of the secondary cylinder 64. The secondary piston 66 moves from the retracted position 36, in which the secondary pumping chamber 76 is of enlarged capacity to the extended position 38, in which the secondary pumping chamber 76 is of reduced capacity as the float 22 rises with rising wave action. The bidirectional port 68 extends through the secondary piston pump 26 into the secondary pumping chamber 76 and is connectable to the fluid container 28 for bidirectionally passing fluid between the secondary pumping chamber 76 and the fluid container 28. The bidirectional port 68 may be located on the secondary piston pump 26 as desired by the user to accommodate configuration, space, sizing, or layout considerations. In the preferred embodiment, as exemplified in FIGS. 4 and 5, the bidirectional port extends through the secondary cylinder 64. As the float falls with falling wave action, the reloading pressure exerted by the fluid in the fluid container 28 through bidirectional port 68 moves the secondary piston 66 from the extended position 38, in which the secondary pumping chamber 76 is of reduced capacity to the retracted position 36, in which the secondary pumping chamber 76 is of enlarged capacity. Interconnection means 40 transfer this motion from the secondary piston pump 26 to the primary piston pump 24 in order to enlarge the capacity of the primary pumping chamber 60 as the capacity of the secondary pumping chamber 76 is enlarged. The interconnection means 40 are preferably effected by yokes which transfer the rising and falling motion of the float 22 between the piston pumps 24, 26, as further explained infra.

Referring to the example of FIGS. 4 and 5, a bidirectional conduit 80 is connected between the bidirectional port 68 of the secondary piston pump 26 and the fluid container 28. The bidirectional conduit 80 may be any form of piping, tubing, or equivalent which will provide fluid and pressure communication between the secondary piston pump 26 and the fluid container 2S and which will withstand the fluid pressures exerted by the fluid within the fluid container 28 as well as the forces exerted by the motion of the pumping apparatus 20. The bidirectional conduit 80 and fluid container 28 should be in ceaseless communication with the secondary pumping chamber 76 so that the reloading pressure of the fluid in fluid container 28 continuously biases or urges the secondary pumping chamber 76 towards the retracted position 36.

Referring to example FIG. 6, the bidirectional conduit 80 may be the fluid container for the secondary pumping means 26, i.e., the bidirectional conduit 80 may function as a standpipe 81, which provides sufficient hydrostatic head and fluid to the secondary pumping chamber 76 to expand the secondary pumping chamber 76 as the float 22 falls with falling wave action. The standpipe 81 may be separate and distinct from the fluid container 28 or recipient of the discharge of the primary piston pump 24, as exemplified in FIG. 10. The standpipe 81 should have sufficient capacity to keep the secondary pumping chamber 76 full of fluid at all times as well as to receive the fluid discharged by the secondary piston pump 26 as the float 22 rises with rising wave action. The hydrostatic head or reloading pressure provided by the standpipe 81 may be created by elevating or extending the bidirectional conduit 80 and standpipe 81 to a sufficient height above the secondary pumping chamber 76 to create the desired hydrostatic head, as exemplified in FIG. 6, or may be created by utilizing an air or gas head within the bidirectional conduit 80 or standpipe 81, i.e., the standpipe 81 may be sealed and injected with pressurized air/gas, as exemplified in FIG. 7. The air/gas in the sealed standpipe 81 should be pressurized such that it will further compress as the conduit 80 receives pumped fluid from the secondary pumping chamber 76 and will expand as the float 22 falls with falling wave action sufficiently to force fluid into the secondary pumping chamber 26, expand the secondary pumping chamber 76, and move the primary pumping means 24 from the discharged position 34 to the reloaded position 32.

The standpipe 81 may be a somewhat rigid structure which generally retains its position with respect to the secondary pumping means or secondary piston pump 26 as the float 22 and pump 26 rise and fall with rising wave action. The standpipe 81 may also be part of a floating structure, may be located on a nearby land mass, may be located on a structure standing above the surface of the body of fluid 21, etc. The fluid container 28 may be part of a floating container, may be mounted on a structure standing above the surface of the body of fluid, etc. Preferably, the fluid container 28 is located on a nearby land mass as exemplified in FIG. 1.

Referring to the example of FIGS. 1, 4, and 5, outlet conduit 82 is provided to connect the outlet check valve 52 of the primary piston pump 24 to the intended recipient of the fluid pumped from the primary piston pump 24. As mentioned above, the outlet conduit 82 may be used to connect the primary pumping means or primary piston pump 24 directly to a hydroelectric generator or other end user and may be used to connect the primary piston pump 24 to a fluid container which is separate and distinct from the fluid container 28 utilized by the secondary pumping means or secondary piston pump 26. The outlet check valve 52 isolates the primary piston pump 24 from the fluid in the outlet conduit 82 when the primary piston pump 24 is reloading, i.e., when the primary pumping chamber 60 is expanding and drawing in fluid through inlet check valve 50 as the float 22 is falling with falling wave action. Therefore, and preferably, the outlet conduit 82 is connected to the same fluid container 28 as the bidirectional conduit 80 and the fluid container 28 is used to both contain the fluid pumped by the primary and secondary piston pumps 24, 26 and to provide the reloading pressure and backflow of fluid necessary to expand the secondary pumping chamber 76 by moving the secondary piston 66 from the extended position 38 to the retracted position 36 as the float 22 falls with falling wave action, as exemplified in FIG. 1. The outlet conduit 82 can be connected directly to the fluid container 28, as seen in FIG. 1, or can be connected to the fluid container 28 via a common conduit 83 shared with bidirectional conduit 80 to simplify and economize the pumping apparatus 20, as exemplified in FIG. 4 or 11. The float 22 should have sufficient buoyancy (or lift) to pump fluid from the primary pumping chamber at a pressure greater than the pressure present in the outlet conduit 82 as well as pump fluid from the secondary pumping chamber 60 at a greater pressure than the reloading pressure present in bidirectional conduit 80.

Referring to the example of FIGS. 1, 4, and 5, inlet conduit 84 may be connected to the inlet check valve 50 to conduct fluid to the inlet check valve 50 and primary pumping chamber 60. The conduit may be extended to areas remote from the pumping apparatus 20 if the fluid immediately surrounding the pumping apparatus 20 is unfit for use by the pumping apparatus 20, e.g., the fluid is corrosive or contains particulate matter damaging to the primary pumping chamber 60, fluid container 28, other components, or end user. The inlet conduit 84 may also be used to isolate or partially isolate the pumped fluid from the body of fluid, i.e., it may be used to pick up and recycle fluid after its discharge and use by the fluid container 28 and/or end user. Such isolation may be advantageous if it is desired to treat or inject the pumped fluid with a chemical, such as a corrosion inhibitor, barnacle inhibitor, etc., or to use a particular type of fluid in the primary pumping chamber 60 and fluid container 28. In the preferred embodiment, as exemplified in FIG. 1, the inlet conduit 84 admits fluid from the body of fluid 21 immediately surrounding the pumping apparatus 20.

Referring to example FIGS. 1, 4, and 5, the anchor 30 is directly or indirectly connected to either the primary piston 44 or the primary cylinder 42 and to either the secondary piston 66 or the secondary cylinder 64. The float 22 is connected, directly or indirectly, to the other of the primary piston 44 or the primary cylinder 42 and to the other of the secondary piston 66 or the secondary cylinder 64 to which the anchor 30 is not connected. The primary and secondary cylinders 42, 64 should be normally retained in a generally vertical position, i.e., with the cylindrical axes 58, 74 generally vertical or generally parallel with an axis defined by the connection point 85 of the pumping means 24, 26 to the float 22 and the connection point 87 of the pumping means 24, 26 to the anchor 30. The float 22 is buoyed above the pumping apparatus 20 by the body of fluid and the anchor 30 extends below the pumping apparatus 20 to anchor the pumping apparatus 20 relative to the float 22. As the float 22 rises or upstrokes with rising wave action, the capacities of the primary pumping chamber 60 and secondary pumping chamber 76 are reduced thereby pumping fluid through the bidirectional conduit 80 to the fluid container 28 or standpipe 81 and through the outlet check valve 52. As the float 22 falls with falling wave action, the reloading pressure of the fluid container 28, which continuously biases the secondary pumping chamber 76 towards the retracted position 36, expands the secondary pumping chamber 76 and downstrokes the float 22. By ceaselessly urging or biasing the secondary pumping chamber 76 towards the retracted position 36, the reloading pressure continuously maintains tension between the secondary piston pump 26 and the buoyancy of the float 22, between the float 22 and anchor 30, and between the secondary piston pump 26 and anchor 30.

For efficient operation, the primary and secondary pumping chamber 60, 76 should be closed or sealed and the primary and secondary relief chambers 62, 78 should be vented, such as to atmosphere or to the body of fluid. If the chambers 62, 78 are to be vented to the body of fluid, the chambers 62, 78 may simply be opened to the body of fluid. In the preferred embodiments of FIGS. 1, 5, 6, 7, 8, 10, and 11, the second end 56, 72 of the primary and secondary cylinders 42, 64 is left open to the body of fluid. In the preferred embodiments of FIGS. 2, 3, 4, and 9, the second end 56, 72 of at least one of the primary and secondary cylinders 42, 64 may be positioned so that it cannot be left open and an aperture or apertures (not illustrated) should be provided in the walls of the relief chambers 62, 78. Since the connection of the float 22 or anchor 30 to the primary and secondary piston 44, 66 passes through the primary and secondary pumping chambers 60, 76, suitable sealing may be provided such as a conventional packing box or stuffing gland 109 to enhance the efficiency of the pumping apparatus 20 by reducing loss of pressurized fluid from the pumping chambers 60, 76.

Referring to the example of FIGS. 1, 4, and 5, preferably the float 22 is tethered to the primary and secondary pumping means, or piston pumps 24, 26, with float tether 86 and the anchor 30 is tethered to the pumps 24, 26 with anchor tether 88. The biasing reloading pressure provided through bidirectional port 68 from the fluid container 28 maintains tension between float 22 and anchor 30, between the pumps 24, 26 and float 22, and between the pumps 24, 26 and anchor 30 through the tethers 86, 88 and thereby maintains tension in the tethers 86, 88. This tension allows the tethers 86, 88 to effectively function as stiff push rods in reducing the capacity of the primary pumping chamber 60 and secondary pumping chamber 76 as the float 22 falls with falling wave action. The pumping apparatus 20 will operate if the tethers 86, 88 are replaced with stiff rods, although not as efficiently. Similarly, the tethers 86, 88 may be replaced with stiff rods having a pivotable or flexible connection, such as a ball joint-type connection, at the float connection point 85 and/or anchor connection point 87. Preferably, the tethers 86, 88 are cable, chain, rope, or equivalent flexible material. More preferably, the tethers 86, 88 are made of such a cable-like material which is durable and resistant to corrosion or other deterioration in the body of fluid 21. The use of tethers 86, 88 with the pumping apparatus 20 provides a wave-powered pumping system that is inexpensive, efficient, expendable, usable in virtually any depth of water, which does not require any moorings other than the anchor 30, which does not require physical access to the bottom or floor of the body of fluid, and which allows the pumping apparatus 20 to track the float's horizontal movement with wave action. The ability of the pumping apparatus 20 to track the float's horizontal motion allows the cylindrical axis 58, 74 of the cylinders 42, 64 to remain generally coaxial with the longitudinal axis defined by the connection point 85 of the pumps 24, 26 (or float tether 86) to the float 22 and the connection point 87 of the pumps 24, 26 (or anchor tether 88) to the anchor 30 and thereby reduces the inefficiencies and destructive lateral forces created by the horizontal motion of the float 22 relative to the pumps 24, 26 and anchor 30. The float tether 86 can be eliminated and the float 22 connected directly to the pumps 24, 26. Preferably, the float tether 86 is used to suspend the pumps 24, 26 below the float 22. The float tether 86 should have sufficient length to suspend the pumps 24, 26 at a level below any anticipated wave action and surface turbulence.

Common Features of FIGS. 5-8.

Referring to the examples of FIGS. 5-8, embodiments are presented in which the primary and secondary piston pumps 24, 26 are juxtaposingly connected between the float 22 and the anchor 30 so that the cylindrical axis 58 of the primary cylinder 42 is generally parallel to the cylindrical axis 74 of the secondary cylinder 64.

Common Features of FIG. 5 and 6

In the example embodiment of FIGS. 5 and 6, piston yoke 102 yokes the primary piston 44 to the secondary piston 66 and cylinder yoke 104 yokes the primary cylinder 42 to the secondary cylinder 64. The cylinder yoke 104 should retain the primary cylinder 42 and the secondary cylinder 64 in approximately the same positions and orientations relative to one another throughout the horizontal and vertical motions of the float 22 and pistons 44, 66 with rising and falling wave action. The cylinder yoke 104 may be a rigid or stiff member, such as a rod, crossbar, strap or equivalent, which holds the cylinders 42, 64 spaced apart, as exemplified in FIG. 5. In the preferred embodiment, as exemplified in FIG. 6, the cylinders 42, 64 are fastened directly to one another by welding, bolting, riveting, or equivalent fastening.

The piston yoke 102 should retain the primary piston 44 and secondary piston 66 in approximately the same positions and orientations with respect to one another throughout the horizontal and vertical motions of the float 22 and pistons 44, 66 with rising and falling wave action. The piston yoke 102 effectively transfers the reloading pressure of the fluid container 28 (or standpipe 81) on the secondary piston 66 to the primary piston 44 and thereby moves the primary piston 64 from the discharged position 34 to the reloaded position 32 as the float 22 falls with falling wave action. The piston yoke 102 may be any shape, form, or material which will accomplish the purpose and functions described herein. Preferably, the piston yoke 102 is a stiff or rigid member, as exemplified in FIGS. 5 and 6, which functions both as a yoke and as piston rods for the pistons 44, 46.

FIG. 5

Referring to the example embodiment of FIG. 5, which is currently believed by the inventor to be the best mode of practicing the invention, the float tether S6 may be connected directly to either or both of the primary piston 44 and secondary piston 66. The float 22 and float tether 86 upstroke the pistons 44, 66 relative to the cylinders 42, 64 as the float 22 rises with rising wave action. The upstroking motion of the pistons 44, 66 reduces the volumetric or fluid capacity of the pumping chambers 60, 76 and thereby pumps fluid from the pumping chamber 60, 76. Since the connection of the float 22 to the pistons 44, 66 passes through at least one of the primary pumping chamber 60 or the secondary pumping chamber 76 and the piston yoke 102 passes through both pumping chambers 60, 76, it is preferred to connect the float 22 or float tether 86 to the piston yoke 102 outside the pumping chambers 60, 76, as exemplified in FIG. 5. This eliminates the need for perforating one of the pumping chambers 60, 76 for the float tether 86 and helps to minimize the loss of pressurized fluid from the pumping chambers 60, 76. The piston yoke 102 is rigid or stiff and its passage through the walls of the pumping chambers 60, 76 should effect a better slidable seal with the perforation or packing around the perforation, since the motion of a rigid rod-like yoke 102 is more limited and uniform than the motion of a flexible tether. If the float tether 86 extends into a pumping chamber 60, 76, it is recommended that the portion of the tether which forms the slidable seal with the wall of pumping chamber 60, 76 be made of a stiff or rigid rod-like material.

The piston yoke 102 may extend out the second ends 56, 72 of the cylinders 42, 64 if a float tether 86 is connected to one or both of the pistons 44, 66. Multiple floats 22 may be connected to the piston yoke 102 or multiple floats 22 and float tethers 86 may be connected independently or unitedly to the pistons 44, 66 although the use of one float 22 is recommended as more expedient. The float tether 86 should be connected to distribute the buoyant forces of the float 22 on the pistons 44, 66 as evenly as possible, considering the relative sizes and pumping loads of the pistons 44, 66.

The anchor tether S8 is connected to one or both of the primary cylinder 42 and secondary cylinder 64 and should be connected to distribute the forces exerted by the anchor 30 on the cylinders 42, 64 as evenly as possible. If a cylinder yoke 104, as illustrated in FIG. 5 is used, the anchor tether 88 may be connected to the cylinder yoke 104. Multiple anchors 30 and anchor tethers 88 may be used, although a single anchor 30 is recommended as more expedient.

FIG. 6

Referring to the example embodiment of FIG. 6, the anchor tether S8 may be connected directly to either or both of the primary piston 44 and the secondary piston 66. Since the connection of the anchor 30 to the pistons 44, 66 passes through at least one of the primary pumping chamber 60 or the secondary pumping chamber 76 and the piston yoke 102 passes through both pumping chambers 60, 76, it is preferred to connect the anchor 30 or anchor tether 88 to the piston yoke 102 outside the pumping chambers 60, 76, exemplified in FIG. 6. This eliminates the need to perforate one of the pumping chambers 60, 76 for the anchor tether 88 and helps to minimize the loss of pressurized fluid from the pumping chambers 60, 76. The piston yoke 102 is rigid or stiff and its passage through the walls of the pumping chambers 60, 76 should effect a better slidable seal with the perforation or packing around the perforation, since the motion of a rigid rod-like yoke 102 is more limited and uniform than the motion of a flexible tether. If the anchor tether 88 extends into the pumping chamber 60, 76, it is recommended that the portion of the tether which forms the slidable seal with the pumping chamber 60, 76 be made of a stiff or rigid rod-like material.

The piston yoke 102 may extend out the second ends 56, 72 of the cylinders 42, 64 if an anchor tether 88 is connected to one or both of the pistons 44, 66. Multiple anchors 30 may be connected to the piston yoke 102 or multiple anchors 30 and anchor tethers 88 may be connected independently or unitedly to the pistons 44, 66, although the use of one anchor 30 is recommended as more expedient. The anchor tether S8 should be connected to distribute the forces of the anchor 30 on the pistons 44, 66 as evenly as possible, considering the relative sizes and pumping loads of the pistons 44, 66.

The float tether 86 is connected to either one or both of the primary cylinder 42 and secondary cylinder 64 and should be connected to distribute the buoyant forces exerted by the float 22 on the cylinders 42, 64 as evenly as possible. The float 22 and float tether 86 upstroke the cylinders 42, 64 as the float 22 rises with rising wave action. As the cylinders 42, 64 upstroke relative to the pistons 44, 66 the volumetric or fluid capacity of the pumping chambers 60, 76 is reduced and fluid is pumped from the pumping chamber 60, 76. If a cylinder yoke 104 is used, the float tether 86 may be connected to the cylinder yoke 104. Multiple floats 22 and float tethers 86 may be used although a single float 22 is recommended as more expedient.

FIG. 7

Figure 7:
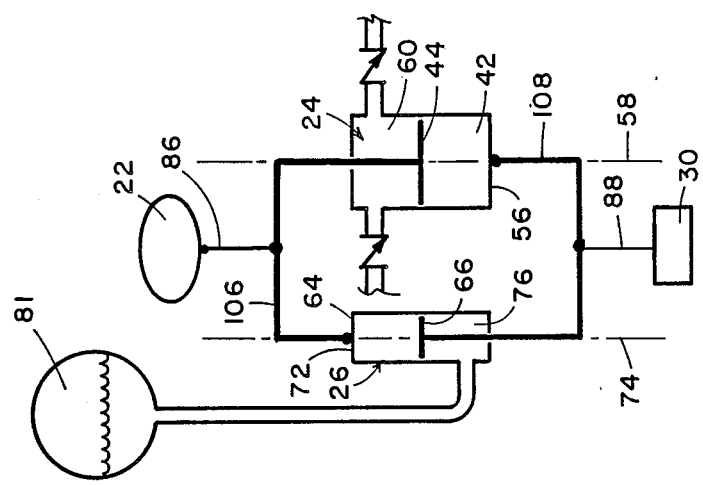
FIG. 7 is a schematic diagram of another embodiment of the wave powered pumping apparatus of the present invention in which pumps ar connected in parallel between the float and anchor.

In the example embodiment of FIG. 7, a first yoke 106 yokes the secondary cylinder 64 to the primary piston 44 and a second yoke 108 yokes the primary cylinder 42 to the secondary piston 66. The float 22 is connected to at least one of the secondary cylinder 64 and the primary piston 44 and upstrokes the secondary cylinder 64 and the primary piston 44 relative to the primary cylinder 42 and secondary piston 66 as the float 22 rises with rising wave action. This upstroking motion of the secondary cylinder 64 and primary piston 44 reduces the volumetric or fluid capacity of the pumping chambers 60, 76 and thereby pumps fluid from the pumping chambers 60, 76. The anchor 30 is connected to at least one of the secondary piston 66 and primary cylinder 42 in order to anchor the secondary piston 66 and primary cylinder 42 relative to the secondary cylinder 64 and the primary piston 44.

Since the primary and secondary cylinders 42, 64 move relative to one another, they should not be rigidly fastened together. The first yoke 106 should retain the secondary cylinder 64 and the primary piston 44 in approximately the same position and orientations relative to one another throughout the horizontal and vertical motions of the float 22 and pumping apparatus 20 with rising and falling wave action. The second yoke 108 should retain the secondary piston 66 and primary cylinder 42 in approximately the same positions and orientations relative to one another throughout the horizontal and vertical motions of the float 22 and pumping apparatus 20 with rising and falling wave action. The first yoke 106 should transmit the downstroking motion of the secondary cylinder 64 created by the reloading pressure of the standpipe 81 as the float 22 falls with falling wave action to the primary piston 44. The second yoke 108 should transmit the tension between the float 22 and the anchor 30 created by the reloading pressure to the primary cylinder 42 so that the primary cylinder 42 retains its position relative to the anchor 30 as the secondary cylinder 64 and primary piston 44 downstroke with falling wave action. Preferably, the first yoke 106 and second yoke 108 are stiff or rigid members. The yokes 106, 108 may be any shape, form, or material which will accomplish the purposes and functions discussed herein.

The float tether 86 may be connected directly to either or both of the secondary cylinder 64 and primary piston 44. Since the connection of the float 22 to the piston 44 passes through the primary pumping chamber 60 and the first yoke 106 also passes through the primary pumping chamber 60, it is preferred to connect the float 22 or float tether 86 to the first yoke 106 outside the pumping chamber 60, as exemplified in FIG. 7. This eliminates the need for perforating the pumping chamber 60 for the float tether 86 and helps to minimize the loss of pressurized fluid from the pumping chamber 60. The first yoke 106 is rigid or stiff and its passage through the wall of the pumping chamber 60 should effect a better slidable seal with the perforation or packing around the perforation, since the motion of a rigid rodlike yoke 106 is more limited and uniform than the motion of a flexible tether. If the float tether 86 extends into the pumping chamber 60, it is recommended that the portion of the tether 86 which forms the slidable seal with the pumping chamber 60 be made of a stiff or rigid rod-like material. Multiple floats 22 may be connected to the first yoke 106 or multiple floats 22 and float tethers 86 may be connected independently or unitedly to the secondary cylinder 64 and primary piston 44, although the use of one float 22 is recommended as more expedient. The float tether 86 should be connected to distribute the buoyant forces of the float 22 on the secondary cylinder 64 and the primary piston 44 as evenly as possible, considering the relative sizes and pumping loads of the primary piston pump 24 and secondary piston pump 26.

The anchor tether 88 may be connected directly to either or both of the secondary piston 66 and the primary cylinder 42. Since the connection of the anchor 30 to the secondary piston 66 passes through the secondary pumping chamber 76 and the second yoke 108 passes through the pumping chamber 76, it is preferred to connect the anchor 30 or anchor tether 88 to the piston yoke 108 outside the pumping chamber 76, as exemplified in FIG. 7. This eliminates the need for perforating the pumping chamber 76 for the anchor tether 88 and helps to minimize the loss of pressurized fluid from the pumping chamber 76. The second yoke 108 is rigid or stiff and its passage through the walls of the pumping chamber 76 will effect a better slidable seal with the perforation or packing around the perforation, since the motion of the rigid rod-like yoke 108 is more limited and uniform than the motion of the flexible tether. If the anchor tether 88 extends into the pumping chamber 76, it is recommended that the portion of the tether 88 which forms the slidable seal with the pumping chamber 76 be made of a stiff or rigid rod-like material. Multiple anchors 30 may be connected to the second yke 108 or multiple anchors 30 and anchor tethers 88 may be connected independently or unitedly to the secondary piston 66 and primary cylinder 42, although as discussed above, the use of one anchor 30 is preferred and is recommended as more expedient. The anchor tether 88 should be connected to distribute the forces of the anchor 30 on the secondary piston 66 and the primary cylinder 42 as evenly as possible, considering the relative sizes and pumping loads of the primary piston pump 24 and secondary piston pump 26.

FIG. 8

Figure 8:
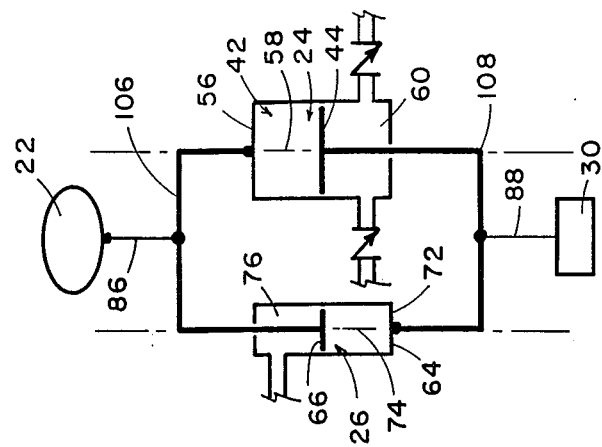
FIG. 8 is a schematic diagram of another embodiment of the wave powered pumping apparatus of the present invention in which pumps are connected in parallel between the float and anchor.

In the embodiment of FIG. 8, a first yoke 106 yokes the secondary piston 66 to the primary cylinder 42 and a second yoke 108 yokes the secondary cylinder 64 to the primary piston 44. The float 22 is connected to at least one of the secondary piston 66 and the primary cylinder 42 and upstrokes the secondary piston 66 and the primary cylinder 42 relative to the secondary cylinder 64 and the primary piston 44 as the float 22 rises with rising wave action. This upstroking motion of the secondary piston 66 and primary cylinder 42 reduces the size of the pumping chambers 60, 76 and thereby pumps fluid from the pumping chamber 60, 76. The anchor 30 is connected to at least one of the secondary cylinder 64 and the primary piston 44 in order to anchor the secondary cylinder 64 and primary piston 44 relative to the secondary piston 66 and primary cylinder 42.

Since the primary and secondary cylinders 42, 64 move relative to one another, they should not be rigidly fastened together. The first yoke 106 should retain the secondary piston 66 and the primary cylinder 42 in approximately the same position and orientations relative to one another throughout the horizontal and vertical motions of the float 22 and pumping apparatus 20 with rising and falling wave action. The second yoke 108 should retain the secondary cylinder 64 and the primary piston 44 in approximately the same positions and orientations relative to one another throughout the horizontal and vertical motions of the float 22 and pumping apparatus 20 with rising and falling wave action. The first yoke 106 should transmit the downstroking motion of the secondary piston 66 created by the reloading pressure of the fluid container 28 (or standpipe S1) as the float 22 falls with falling wave action to the primary cylinder 42. The second yoke 108 should transmit the tension between the float 22 and the anchor 30 created by the reloading pressure to the primary piston 44 so that the primary piston 44 retains its position relative to the anchor 30 as the secondary piston 66 and primary cylinder 42 downstroke with falling wave action. Preferably, the first yoke 106 and second yoke 108 are stiff or rigid rod-like members. The yokes 106, 108 may be any shape, form, or material which will accomplish the purposes and functions described herein.

The float tether 86 may be connected directly to either or both of the secondary piston 66 and the primary cylinder 42. Since the connection of the float 22 to the secondary piston 66 passes through the secondary pumping chamber 76 and the first yoke 106 also passes through the secondary pumping chamber 76, it is preferred to connect the float 22 or float tether 86 to the first yoke 106 outside the pumping chamber 76, as exemplified in FIG. 8. This eliminates the need for perforating the pumping chamber 76 for the float tether S6 and also helps to minimize the loss of pressurized fluid from the pumping chamber 76. The first yoke 106 is rigid or stiff and its passage through the wall of the pumping chamber 76 should effect a better slidable seal with the perforation or packing around the perforation, since the motion of a rigid rod-like yoke IO6 is more limited and uniform than the motion of a flexible tether. If the float tether 86 extends into the pumping chamber 76, it is recommended that the portion of the tether 86 which forms the slidable seal with the pumping chamber 76 be made of a stiff or rigid rod-like material. Multiple floats 22 may be connected to the first yoke 106 or multiple flats 22 and float tethers 86 may be connected independently or unitedly to the secondary piston 66 and primary cylinder 42, although the use of one float is recommended as more expedient. The float tether 86 should be connected to distribute the buoyant forces of the float 22 on the secondary piston 66 and the primary cylinder 42 as evenly as possible, considering the relative sizes and pumping loads of the primary piston pump 24 and secondary piston pump 26.

The anchor tether 88 may be connected directly to either or both of the secondary cylinder 64 and the primary piston 44. Since the connection of the anchor 30 to the piston 44 passes through the primary pumping chamber 60 and the second yoke 108 passes through the pumping chamber 60, it is preferred to connect the anchor 30 or anchor tether 88 to the piston yoke 108 outside the pumping chamber 60, exemplified in FIG. 8. This eliminates the need for perforating the pumping chamber 60 for the anchor tether SS and helps to minimize the loss of pressurized fluid from the pumping chamber 60. The second yoke 108 is rigid or stiff and its passage through the walls of the pumping chamber 60 should effect a better slidable seal with the perforation or packing around the perforation, since the motion of the rigid rod-like yoke 108 is more limited and uniform than the motion of the flexible tether. If the anchor tether 88 extends into the primary pumping chamber 60, it is recommended that the portion of the tether 88 which forms the slidable seal with the pumping chamter 60 be made of a stiff or rigid rod-like material. Multiple anchors 30 may be connected to the second yoke 108 or multiple anchors 30 and anchor tethers 88 may be connected independently or unitedly to the secondary cylinder 64 and primary piston 44, although as discussed above, the use of one anchor 30 is preferred and is recommended as more expedient. The anchor tether 88 should be connected to distribute the forces of the anchor 30 on the secondary cylinder 64 and primary piston 44 as evenly as possible, considering the relative sizes and pumping loads of the primary piston pump 24 and secondary piston pump 26.

Common Features of FIGS. 2, 3, 4, and 9

FIGS. 2, 3, 4, and 9 present example embodiments of the present invention in which the primary and secondary piston pumps 24, 26 are arranged in series so that the primary and secondary cylinders 42, 64 are arranged cylinder-end to cylinder-end between the float 22 and anchor 30. The cylinders 42, 64 may be axially or sequentially spaced apart between the float 22 and anchor 30. The cylinders 42, 64 may be non-coaxially arranged, although the cylindrical axes 58, 74 should be generally parallel. Preferably, one end 54, 56 of the primary cylinder 42 is in physical contact with one end 70, 72 of the secondary cylinder 64. More preferably, the cylinders 42, 64 are coaxially fastened end to end, as exemplified in FIGS. 2, 3, 4, and 9. The cylinders 42, 64 may share a common end plate when fastened end to end. The coaxial arrangement of the cylinders 42, 64 is preferred to maintain linearity of the tensile forces created between the buoyancy of the float 22 and the anchor 30 and to thereby prevent the formation of torsional force couples within the pumping apparatus 20 which may be created by the existence of non-coaxial opposing forces.

Common Features of FIGS. 3 and 4

In the example embodiments of FIGS. 3 and 4, the float 22 is connected to at least one of the primary piston 44 and secondary piston 66 and upstrokes the pistons 44, 66 relative to the cylinders 42, 64 as the float 22 rises with rising wave action. The anchor 30 is connected to at least one of the primary cylinder 42 and the secondary cylinder 64 in order to anchor the cylinders 42, 64 relative to the pistons 44, 66. One or more floats 22 and float tethers 86 may be used to upstroke the pistons 44, 66 and may also be used to yoke the primary piston 44 to the secondary piston 66 so that the pistons 44, 66 are upstroked simultaneously with a rising wave. Similarly, one or more anchors 30 and anchor tethers 88 may be used to yoke the primary cylinder 42 to the secondary cylinder 64 so that the cylinders 42, 64 effectively share a common anchor 30. The tension created between the secondary piston 66 and the float 22 and between the secondary cylinder 64 and the anchor 30 by the reloading pressure should be transferred to the primary cylinder 42 so that the reloading pressure will simultaneously downstroke both pistons 44, 66 relative to both cylinders 42, 64 as the float 22 falls with falling wave action.

Preferably, as exemplified in FIGS. 3 and 4, a piston yoke 102 yokes the primary piston 44 to the secondary piston 66 so that the pistons 44, 66 are simultaneously upstroked by the float 22 with rising wave action. The cylinders 42, 64 may be yoked together with a cylinder yoke (not illustrated). Such a stiff or rigid rod-like member may be used to axially or sequentially space apart the cylinders 42, 64 between the float 22 and anchor 30. Preferably, one end 54, 56 of the primary cylinder 42 is coaxially fastened to one end 70, 72 of the secondary cylinder, as exemplified in FIGS. 3 and 4, and the cylinders 42, 64 may share a common end plate. The cylinders 42, 64 may be fastened together by chemical bonding, welding, mechanical fasteners, or similar fastening.

FIG. 4.

More preferably, as exemplified in the embodiment of FIG. 4, the float 22 is connected to the primary piston 44, the anchor 30 is connected to the secondary cylinder 64, and the second end 56 of the primary cylinder 42 is coaxially fastened to the first end 70 of the secondary cylinder 64. As the float rises with rising wave action, the primary piston 44, piston yoke 102, and secondary piston 66 are upstroked relative to the primary and secondary cylinders 42, 64 thereby reducing the volumetric or fluid capacity of the pumping chambers 60, 76 and pumping fluid from the pumping chambers 60, 76. As the float 22 falls with falling wave action, the reloading pressure exerted by the fluid in the fluid container 28 through the bidirectional conduit 80 expands the secondary pumping chamber 76 and downstrokes the secondary piston 66 relative to the secondary cylinder 64. The forces exerted by the reloading pressure are transferred from the secondary piston 66 to the primary piston 44 by piston yoke 102 and are transferred from the secondary cylinder 64 to the primary cylinder 42 by the cylinder yoke or fastening together of the cylinders 42, 64. Piston yoke 102 may be a flexible tether since the tension created between the secondary piston 66 and the buoyancy of the float 22 by the reloading pressure will maintain tension in the piston yoke 102. Since the float tether 86 and piston yoke 102 must pass through the walls of the primary pumping chamber 60 and the secondary pumping chamber 76 respectively, it is preferred that the piston yoke 102 be a stiff or rigid rod-like member and that the portion of the float tether S6 which extends through the wall of the primary pumping chamber 60 and into the pumping chamber 60 be a stiff or rigid rod-like member in order to effect a better slidable seal with the perforations or packing around the perforations in the walls of the primary and secondary pumping chambers 60, 76 through which the float tether 86 and piston yoke 102 pass.

FIG. 3.

In another more preferable embodiment, as exemplified in FIG. 3, the float 22 is connected to the secondary piston 66, the anchor 30 is connected to the primary cylinder 42, and the second end 72 of the secondary cylinder 64 is coaxially fastened to the first end 54 of the primary cylinder 42. As the float 22 rises with rising wave action, the secondary piston 66, piston yoke 102, and primary piston 44 are upstroked relative to the primary and secondary cylinders 42, 64 thereby reducing the volumetric or fluid capacity of the pumping chambers 60, 76 and pumping fluid from the pumping chambers 60, 76. As the float 22 falls with falling wave action, the reloading pressure exerted by the fluid in the fluid container 28 (or standpipe 81) through the bidirectional conduit 80 in the secondary pumping chamber 76 expands the secondary pumping chamber 76 and downstrokes the secondary piston 66 relative to the secondary cylinder 64. The forces exerted by the reloading pressure are transferred from the secondary piston 66 to the primary piston 44 by piston yoke 102 and are transferred from the secondary cylinder 64 to the primary cylinder 42 by the cylinder yoke or fastening together of the cylinders 42, 64. Piston yoke 102 should be a stiff or rigid rod-like member in order to transfer the downstroking motion of the secondary piston 66 to the primary piston 44 as the float 22 falls with falling wave action. Since the float tether 86 passes through the wall of the secondary pumping chamber 76, it is preferred that the portion of the float tether 86 which extends through the wall of the secondary pumping chamber 76 and into the pumping chamber 76 be a stiff or rigid rod-like member in order to effect a better slidable seal with the perforation or packing around the perforation in the wall of the pumping chamber 76 through which the float tether 86 passes.

Common Features of FIGS. 2 and 9

In the example embodiments of FIGS. 2 and 9, the float 22 is connected to at least one of the primary cylinder 42 and secondary cylinder 64 and upstrokes the cylinders 42, 64 relative to the pistons 44, 66 as the float 22 rises with rising wave action. The anchor 30 is connected to at least one of the primary piston 44 and the secondary piston 66 in order to anchor the pistons 44, 66 relative to the cylinders 42, 64. One or more floats 22 and float tethers 86 may be used to upstroke the cylinders 42, 64 and may also be used to yoke the primary cylinder 42 to the secondary cylinder 64 so that the cylinders 42, 64 are upstroked simultaneously with the rising wave. Similarly, one or more anchors 30 and anchor tethers 88 may be used to yoke the primary piston 44 to the secondary piston 66 so that: the pistons 44, 66 effectively share a common anchor 30, the tension created between the secondary piston 66 and the anchor 30 and between the secondary cylinder 64 and the float 22 by the reloading pressure is transferred to the primary piston 44, and the reloading pressure will simultaneously downstroke both cylinders 42, 64 relative to both pistons 44, 66 as the float 22 falls with falling wave action.

Preferably, as exemplified in FIGS. 2 and 9, a piston yoke 102 yokes the primary piston 44 to the secondary piston 66 so that the pistons 44, 66 are simultaneously downstroked relative to the cylinders 42, 64 by the anchor 30 as the float 22 and cylinders 42, 64 rise with rising wave action. The cylinders 42, 64 may be yoked together with a cylinder yoke (not illustrated) similar to the yoke 104 of FIG. 2. Such a stiff or rigid rodlike yoke may be used to axially or sequentially space apart the cylinders 42, 64 between the float 22 and anchor 30. Preferably, one end 54, 56 of the primary cylinder 42 is coaxially fastened to one end 70, 72 of the secondary cylinder 64, as exemplified in FIGS. 2 and 9, and the cylinders 42, 64 may share a common end plate. The cylinders 42, 64 may be fastened together by chemical bonding, welding, mechanical fasteners, or similar fastening.

FIG. 2.

More preferably, as exemplified in the embodiment of FIG. 2, the float 22 is connected to the primary cylinder 42, the anchor 30 is connected to the secondary piston 66, and the first end 54 of the primary cylinder 42 is coaxially fastened to the second end 72 of the secondary cylinder 64. As the float 22 rises with rising wave action, the primary cylinder 42 and secondary cylinder 44 are upstroked relative to the primary and secondary pistons 44, 66 thereby reducing the volumetric or fluid capacity of the pumping chambers 60, 76 and pumping fluid from the pumping chambers 60, 76. As the float 22 falls with falling wave action, the reloading pressure exerted by the fluid in the fluid container 28 (or standpipe 81) through the bidirectional conduit 80 expands the secondary pumping chamber 76 and downstrokes the secondary cylinder 64 relative to the secondary piston 66. The forces exerted by the reloading pressure are transferred from the secondary piston 66 to the primary piston 44 by piston yoke 102 and are transferred from the secondary cylinder 64 to the primary cylinder 42 by the cylinder yoke or fastening together of the cylinders 42, 64. Piston yoke 102 should be a rigid or stiff rod-like member so that the primary piston 44 is able to use the tension in the anchor tether 88 to maintain its position relative to the anchor 30 as the primary cylinder 42 downstrokes with falling wave action. Since the anchor tether 88 and piston yoke 102 pass through the walls of the pumping chambers 60, 76, it is preferred that the portion of the anchor tether 88 which extends through the wall of the secondary pumping chamber 76 and into the pumping chamber 76 be a stiff or rigid rod-like member and that the piston yoke 102 be a rigid or stiff rod-like member in order to effect a better slidable seal with the perforation or packing around the perforations in the walls of the primary and secondary pumping chambers 60, 76 through which the piston yoke 102 and anchor tether 88 pass.

FIG. 9

In another more preferable embodiment, as exemplified in FIG. 9, the float 22 is connected to the secondary cylinder 64, the anchor 30 is connected to the primary piston 44, and the first end 70 of the secondary cylinder 64 is coaxially fastened to the second end 56 of the primary cylinder 42. As the float 22 rises with rising wave action, the secondary cylinder 64 and primary cylinder 42 are upstroked relative to the primary and secondary pistons 44, 66 thereby reducing the volumetric or fluid capacity of the pumping chambers 60, 76 and pumping fluid from the pumping chambers 60, 76. As the float 22 falls with falling wave action, the reloading pressure exerted by the fluid and the fluid container 28 (or standpipe 81) through the bidirectional conduit 80 expands the secondary pumping chamber 76 and downstrokes the secondary cylinder 64 relative to the secondary piston 66. The forces exerted by the reloading pressure are transferred from the secondary piston 66 to the primary piston 44 by piston yoke 102 and are transferred from the secondary cylinder 64 to the primary cylinder 42 by the cylinder yoke or fastening together of the cylinders 42, 64. Piston yoke 102 may be a flexible tether since the tension created between the secondary piston 66 and the anchor 30 will maintain tension in the piston yoke 102. Since the anchor tether 88 and piston yoke 102 pass through the walls of the primary pumping chamber 60 and the secondary pumping chamber 76 respectively, it is preferred that the piston yoke 102 be a stiff or rigid rod-like member and that the portion of the anchor tether which extends through the wall of the primary pumping chamber 60 and into the pumping chamber 60 be a stiff or rigid rod-like member in order to effect a better slidable seal with the perforations or packing around the perforations in the walls of the primary and secondary pumping chambers 60, 76 through which the anchor tether 88 and piston yoke 102 pass.

Common Features of FIGS. 10 and 11

Referring to the example of FIGS. 10 and 11, embodiments are presented in which the primary and secondary piston pumps 24, 26 are generally concentrically and generally coaxially arranged between the float 22 and the anchor 30 so that one of the primary or secondary piston pump 24, 26 is at least partially contained within the other piston pump 24, 26. Preferably, the secondary piston pump 26 is at least partially contained within the primary piston pump 24, since the primary piston pump 24 is the working pump or the pump which is used to pump energy for storage and should have a larger volumetric or fluid capacity, whereas the secondary piston pump 26 is normally used to reload the primary piston pump 24. The primary piston pump 24 may be contained within the secondary piston pump 26 if this arrangement is found to be more efficient or advantageous in a particular arrangement, construction, or system.

In the embodiment of FIG. 10, piston yoke 102 yokes the primary piston 44 to the secondary piston 66 and the secondary cylinder 64 is concentrically and coaxially fastened within the primary cylinder 42. The cylinders 42, 64 may be fastened together by chemical bonding, welding, mechanical fasteners, or similar fastening. The float 22 is connected to at least one of the primary piston 44 and the secondary piston 66 for upstroking the pistons 44, 66 relative to the cylinders 42, 64 as the float 22 rises with rising wave action. The anchor 30 is connected to at least one of the primary cylinder 42 and the secondary cylinder 64 in order to anchor cylinders 42, 64 relative to the pistons 44, 66 and float 22. For further description of the structure and operation of this embodiment, the reader is referred to the analogous description of FIG. 5, supra.

In the embodiment of FIG. 11, piston yoke 102 yokes the primary piston 44 to the secondary piston 66 and the secondary cylinder 64 is concentrically and coaxially fastened within the primary cylinder 42. The cylinders 42, 64 may be fastened together by chemical bonding, welding, mechanical fasteners, or similar fastening. The float 22 is connected to at least one of the primary cylinder 42 and secondary cylinder 64 for upstroking the cylinders 42, 64 relative to the pistons 44, 66 as the float rises with rising wave action and thereby pumping fluid from the pumping chamber 60, 76. The anchor 30 is connected to at least one of the primary piston 44 and secondary piston 66 for anchoring the pistons 44, 66 relative to the cylinders 42, 64 and float 22. For further description of the structure and operation of FIG. 11, the reader is referred to the analogous description of FIG. 6, supra.

FIGS. 10 and 11 are also used to illustrate variations of FIGS. 5 and 6 wherein multiple primary and/or secondary pumps 24, 26 are juxtaposingly connected between the float 22 and the anchor 30.

Details of Construction

The float 22 may be a surface float, semi-submersible float, submersible float, or any equivalent form of buoyant device which will capture wave energy and provide the desired lift or buoyancy. The anchor 30 may be a bottom anchor, a sea anchor, a drag-type anchor, or any equivalent device which will adequately oppose the rising and falling motion of the float 22.

The float 22 (i.e., the buoyancy or lift of the float 22) is sized to provide a desired discharge pressure by multiplying the combined area of the primary piston 44 and the secondary piston 66 with the desired discharge pressure. For example, if the surface area of the primary piston 44 within the primary pumping chamber 60 is 40 square inches, and the surface area of the secondary piston 66 within the secondary pumping chamber 76 is 10 square inches and a discharge pressure of 50 pounds per square inch is required to pump fluid from the primary pumping chamber to fluid container 28 or other end user and/or to pump fluid from the secondary pumping chamber 76 into fluid container 28 or standpipe 81, the float 22 must provide 2,500 pounds of lift (50 pounds per square inch times 50 square inches equals 2,500 pounds).

The secondary piston pump or secondary pumping means 26 should be sized to maintain sufficient tension between float 22 and anchor 30, between float 22 and the secondary pumping means 26, and between the secondary pumping means 26 and anchor 30 that the primary and secondary cylinders 42, 64 are normally retained in a generally vertical position, e.g., with the cylindrical axes 58, 74 generally vertical or generally parallel with an axis defined by the connection point 85 of the pumps 24, 26 to the float 22 and the connection point 87 of the pumps 24, 26 to the anchor 30. The tension should be of such magnitude that the float 22 does not drift significantly with respect to the primary and secondary pumping means 24, 26 since such drifting creates inefficiency, i.e., lost motion, and potentially destructive lateral forces on the pumping means 24, 26. In other words, the tension should be of such magnitude that the primary and secondary pumping means 24, 26 track the float's horizontal movement with wave action, i.e., there should be sufficient tension in the pumping apparatus 20 that the longitudinal axes of the tethers 86, 88 and cylinders 42, 64 remain generally parallel. Similarly, the secondary pumping means or piston pump 26 should not be oversized as too much tension will inhibit the float's ability to rise with rising wave action and will inhibit the efficiency of the pumping apparatus 20. The inventor has found that the reloading force provided by the secondary piston pump 26 should be within a range of about five percent to ninety-five percent of the lift of float 22. The reloading force is determined by multiplying the hydrostatic head of pressure (reloading pressure) exerted on the secondary pumping chamber 76 by the fluid in bidirectional conduit 80 with the surface area of the secondary piston 66 within the secondary pumping chamber 76. For example, if the hydrostatic head of fluid provides 50 pounds per square inch reloading pressure and the area of the secondary piston 66 is 10 square inches, the reloading force is 500 pounds. At the lower end of the recommended range, the float 22 will be more sensitive to wave action and at the higher end of the range, the float 22 will ride deeper in the fluid. The range is not intended to be limiting, for example, there may be special types of floats, fluids, weather conditions, etc. in which the reloading force should be less than five percent or greater than ninety-five percent of the lift of float 22.

In all of the embodiments of FIGS. 1–11 discussed supra, it is preferred that the primary pumping chamber 60 have a larger volumetric capacity than the second pumping chamber 76, since the primary pumping chamber 60 is the working chamber which delivers fluid for energy for storage or use by an end user, whereas the secondary pumping chamber 76 pumps fluid to provide the energy to reload itself and the primary pumping chamber 60 or primary pumping means 24. To add to the efficiency of the pumping apparatus 20 and reduce the costs of materials, the distance moved by the primary piston 44 in moving from the reloaded position 32 to the discharged position 34 should be about equal to the distance moved by the secondary piston 66 in moving from the retracted position 36 to the extended position 38. In other words, the stroke lengths of the primary piston pump 24 and secondary piston pump 26 should be approximately equal.

The stroke lengths of the pumps 24, 26 should be sized so that the pistons 44, 66 do not strike the ends of the cylinders 42, 64 under normal operating conditions, allowing for wave height, tide cycles, variations in fluid flow through the body of fluid, etc. Such sizing allows the reloading pressure to continuously maintain resilient tension between the float 22 and anchor 30, between the pumps 24, 26 and float 22, and between the pumps 24, 26 and anchor 30. The resilient tension created by the reloading pressure controls the motion of the pumping apparatus 20, i.e., the pumps 24, 26 track the horizontal motion of the float 22 as discussed supra, and convert the wave energy acting on the float 22 into useful pumping or reloading forces rather than uncontrolled motion and potentially destructive forces.

The efficiency of the primary and secondary pumping chambers 60, 76 is increased by having the pumping chambers 60, 76 as fluid tight or leak free as possible at the working or discharge pressure of the chambers 60, 76. The perforations through the walls of the pumping chambers 60, 76 through which the yokes 102, 104 or tethers 86, 88 pass may be sealed by conventional packing boxes, stuffing glands, or equivalent sealing means 109, exemplified in FIGS. 4 and 5, to assist in sealing the chambers 60, 76 and to increase the durability of the chambers 60, 76 by reducing wear.

Operation

FIG. 1 represents an exemplary use of the present invention as well as a means of protecting the pumping apparatus 20 from excessive wave action. As illustrated in FIG. 1, at least one pumping apparatus 20 is connected to a fluid container 28 or other end user. The fluid container 28 is located above the fluid level of the body of fluid 21 and above the pumping apparatus 20. The fluid container 28 may be a reservoir, surge pipe, or any means of at least temporary retaining and directing the elevated pumped fluid and the potential energy stored therein. An example use of the elevated fluid, illustrated in FIG. 1, would be to operate a hydroelectric generator 110.

The outlet conduits 82 from the outlet check valves 52 of the primary pumping means 24 are connected to the fluid container 28. In FIG. 1, outlet conduits 82 are connected to the fluid container 28 through manifold conduit 112. A valve 114 is located in the manifold conduit 112 above the pumping apparatus 20 for opening and closing the communication between the pumping apparatus 20 and the fluid container 28 through the conduit 112. Outlet conduits 82 may also be individually connected to the fluid container 28 and may have a valve 114 in each conduit 82.

The valve 114 may be used to protect pumping apparatus 20 by simply closing the valve 114, if the bidirectional conduits 80 are not connected to the outlet conduits 82 or manifold conduit 112. Closing the valve 114 prevents the primary pumping means 24 from discharging or pumping as the float 22 rises with rising wave action. Since the bidirectional conduits 80 are not closed by valve 114, with each successively lower wave trough, the pumping apparatus 20 will be reloaded, i.e., the primary and secondary pumping chambers 60, 76 will be enlarged by the reloading pressure present in the bidirectional conduit 80, and as the pumping chambers 60, 76 are enlarged, the pumping apparatus 20 will draw more fluid into the primary pumping means 24 through inlet check valve 50 and the float 22 will be held at the level of the lowest wave trough. The valve 114 may be a manually or an automatically operated device.

The bidirectional conduits 80 of the secondary pumping means or secondary piston pump 26 may be individually connected to fluid container 28 (not illustrated) or may be connected to the fluid container 28 through a shared conduit 116 if it is desired to protect the pumping apparatus 20 with valve 114. Similarly, the secondary piston pump 26 may have individual standpipes 81, as discussed supra and exemplified in FIG. 6 or 7, or may be connected to a common standpipe 81 which is isolated from fluid container 28 if it is desired to utilize valve 114 to protect the pumping apparatus 20 as discussed in the preceding paragraph. If it is not desired to protect the pumping apparatus 20 with valve 114, the bidirectional conduits 80 may be connected to manifold conduit 112 or to outlet conduits 82 as exemplified in FIG. 4.

Surge arresting devices may be placed in the manifold conduit 112, shared conduit 116, outlet conduit 82, and/or bidirectional conduit 80, to remove the pressure and flow pulsations or surging created by the discharge of the pumping apparatus 20. Such surge arresting devices can enhance the efficiency of the pumping apparatus 20, particularly if the fluid container 28 has limited capacity or if the distance between the pumping apparatus 20 and the fluid container 28 or end user is large.

The described embodiments of the pumping apparatus 20 may be made of low cost, easily obtained and replaced components made of plastic, polymer, metal, wood, styrofoam, etc. The components should be selected to withstand the maximum fluid pressures expected in the pumping apparatus 20. Because the components are easily obtainable (metal, plastic, or polymeric pumps, valves, and floats are commercially available, as are cables, chains, tethers, and anchors of various materials) they may be made of cheaper materials having a limited life in order to keep the cost of the pumping apparatus 20 to a minimum.

While the invention has been described with a certain degree of particularity, it is manifest that many changes may be made in the details of construction and the arrangement of components without departing from the spirit and scope of this disclosure. It is intended to be understood that the invention is not limited to the specific embodiments set forth herein to exemplify the invention, but the invention is to be limited only by the scope of the attached claims, including the full range of equivalency to which each element or step thereof is entitled.

What is claimed is:

1. A pumping apparatus for pumping fluid using energy from rising and falling wave action in a body of fluid, comprising:
a primary piston pump, comprising:
   a primary cylinder;
   a primary piston reciprocally disposed in the primary cylinder and cooperating with the primary cylinder to form a primary pumping chamber on one side of the primary piston and a primary relief chamber on the other side of the primary piston;
   an inlet port extending through the primary piston pump into the primary pumping chamber for admitting fluid to the primary pumping chamber;
   an outlet port extending through the primary piston pump into the primary pumping chamber for discharging fluid from the pumping chamber;
   an inlet check valve connected to the inlet port; and
   an outlet check valve connected to the outlet port;
a secondary piston pump, comprising:
   a secondary cylinder;
   a secondary piston reciprocally disposed in the secondary cylinder and cooperating with the secondary cylinder to form a secondary pumping chamber on one side of the secondary piston and a secondary relief chamber on the other side of the secondary piston; and
   a bidirectional port, connected to a fluid container extending above the pumping apparatus, for bidirectionally passing fluid between the secondary pumping chamber and the fluid container;
an anchor connected to either the primary piston or the primary cylinder and connected to either the secondary piston or the secondary cylinder; and
a float, connected to the one of the primary piston and the primary cylinder and connected to the one of the secondary piston and the secondary cylinder to which the anchor is not connected, the float moving the one of the primary piston and the primary cylinder and the one of the secondary piston and the secondary cylinder to which the float is connected relative to the other of the primary piston and the primary cylinder and the other of the secondary piston and the secondary cylinder to which the anchor is connected as the float is upstroked by a rising wave action, thereby reducing the capacity of the primary and secondary pumping chambers and pumping fluid from the primary and secondary pumping chambers;
interconnection means, connected between the primary and the secondary piston pumps, for enlarging the capacity of the primary pumping chamber as the capacity of the secondary pumping chamber is enlarged; and
wherein the fluid in the fluid container exerts a reloading pressure in the secondary pumping chamber in opposition to the buoyancy of the float; the reloading pressure moving the one of the secondary piston and the secondary cylinder to which the float is connected, enlarging the size of the secondary pumping chamber, and downstroking the float in response to falling wave action; and thereby moving the one of the primary piston and the primary cylinder to which the float is connected, enlarging the capacity of the primary pumping chamber, downstroking the float, and drawing fluid into the primary pumping chamber through the inlet check valve in response to falling wave action.

2. A method of pumping fluid using energy from rising and falling wave action in a body of fluid comprising:
   connecting a primary pumping means between a float and anchor in a body of fluid;
   connecting a secondary pumping means between a float and an anchor in a body of fluid;
   pumping fluid with the primary pumping means as the float rises with rising wave action;
   pumping fluid into a fluid container extending above the primary and secondary pumping means with the secondary pumping means as the float rises with rising wave action;
   exerting reloading pressure on the secondary pump with the fluid in the fluid container in opposition to the buoyancy of the float;
   using the reloading pressure to reload the secondary pump as the float falls with falling wave action; and
   interconnecting the primary pumping means and the secondary pumping means so that the primary pump is reloaded as the secondary pump is reloaded.

3. The method of claim 2:
   wherein the primary pumping means and secondary pumping means are connected between a float and an anchor.

4. The method of claim 2:
   wherein the pumping fluid with the primary pumping means step is further defined as pumping fluid into the fluid container extending above the pumps.

5. The method of claim 4 further comprising the step of:
   operating a hydroelectric generator with fluid from the fluid container.

6. A pumping apparatus for pumping fluid using energy from rising and falling wave action in a body of fluid, comprising:
   at least one float;
   primary pumping means, connectable to the float, for pumping fluid as the float rises with rising wave action, the primary pumping means being moved from a reloaded position to a discharged position as the float rises with rising wave action and thereby pumping fluid;
   secondary pumping means, connectable to the float and connectable to a fluid container extending above the pumping apparatus, for pumping fluid into the fluid container as the float rises with rising wave action and for moving the primary pumping means from the discharged position to the reloaded position as the float falls with falling wave action;
   at least one anchor, connectable to at least one of the primary pumping means and the secondary pumping means, for anchoring the primary pumping means and the secondary pumping means relative to the float; and
   wherein the fluid in the fluid container exerts a reloading pressure in the secondary pumping means, the reloading pressure providing opposition to the buoyancy of the float.

7. The apparatus of claim 6:
   wherein the secondary pumping means is moved from a retracted position to an extended position as the float rises with rising wave action; and
   wherein the reloading pressure moves the secondary pumping means from the extended position to the retracted position as the float falls with falling wave action, thereby moving the primary pumping means from the discharged position to the reloaded position as the float falls with falling wave action.

8. The apparatus of claim 6:
   wherein the reloading pressure maintains tension between the float and anchor, between the secondary pumping means and the float, and between the secondary pumping means and the anchor.

9. The apparatus of claim 6:
   wherein the primary pumping means pumps fluid into the fluid container as the float rises with rising wave action.

10. The apparatus of claim in which the secondary pumping means comprises:
    a secondary piston pump.

11. The apparatus of claim 6, in which the primary pumping means comprises:
    a primary piston pump.

12. The apparatus of claim 6, in which the primary pumping means comprises at least one primary piston pump and in which the secondary pumping means comprises at least one secondary piston pump; and
    wherein each primary piston pump comprises:
       a primary cylinder having a first end, a second end, and a cylindrical axis extending between the first end and the second end;
       a primary piston reciprocally disposed in the primary cylinder and cooperating with the primary cylinder to form a primary pumping chamber between the primary piston and the first end of the primary cylinder and to form a primary relief chamber between the primary piston and the second end of the primary cylinder, the primary piston moving from the reloaded position in which the primary pumping chamber is of enlarged capacity to the discharged position in which the primary pumping chamber is of reduced capacity as the float rises with rising wave action;
       an inlet port extending through the primary piston pump into the primary pumping chamber for admitting fluid to the primary pumping chamber;
       an outlet port extending through the primary piston pump into the primary pumping chamber for discharging fluid from the primary pumping chamber;
       an inlet check valve connectable to the inlet port; and
       an outlet check valve connectable to the outlet port; and
    wherein each secondary piston pump comprises:
       a secondary cylinder having a first end, a second end, and a cylindrical axis extending between the first end and the second end;
       a secondary piston reciprocally disposed in the secondary cylinder and cooperating with the secondary cylinder to form a secondary pumping chamber between the secondary piston and the first end of the secondary cylinder and to form a secondary relief chamber between the secondary piston and the second end of the secondary cylinder, the secondary piston moving from the retracted position in which the secondary pumping chamber is of enlarged capacity to the extended position in which the secondary pumping chamber is of reduced capacity as the float rises with rising wave action; and
       a bidirectional port extending through the secondary piston pump into the secondary pumping chamber and connectable to the fluid container for bidirectionally passing fluid between the secondary pumping chamber and the fluid container; and wherein the pumping apparatus further comprises:
interconnection means for enlarging the capacity of the primary pumping chamber as the capacity of the secondary pumping chamber is enlarged.

13. The apparatus of claim 12:
wherein the anchor is connected to either the primary piston or the primary cylinder and to either the secondary piston or the secondary cylinder; and
wherein the float is connected to the other of the primary piston or the primary cylinder and to the other of the secondary piston or the secondary cylinder to which the anchor is not connected.

14. The pumping apparatus of claim 12:
wherein the primary pumping chamber has a larger volumetric capacity than the secondary pumping chamber.

15. The apparatus of claim 12:
wherein the distance moved by the primary piston in moving from the reloaded position to the discharged position is about equal to the distance moved by the secondary piston in moving from the retracted position to the extended position.

16. The apparatus of claim 12:
wherein the primary and secondary piston pumps are juxtaposingly connected between the float and the anchor, so that the cylindrical axis of the primary cylinder is generally parallel to the cylindrical axis of the secondary cylinder.

17. The apparatus of claim 16, in which the interconnection means comprises:
a piston yoke yoking the primary piston to the secondary piston; and
a cylinder yoke yoking the primary cylinder to the secondary cylinder; and
wherein the float is connected to at least one of the primary piston and the secondary piston; and
wherein the anchor is connected to at least one of the primary cylinder and the secondary cylinder.

18. The apparatus of claim 16, in which the interconnection means comprises:
a piston yoke yoking the primary piston to the secondary piston; and
a cylinder yoke yoking the primary cylinder to the secondary cylinder; and
wherein the float is connected to at least one of the primary cylinder and the secondary cylinder; and
wherein the anchor is connected to at least one of the primary piston and the secondary piston.

19. The apparatus of claim 16, in which the interconnection means comprises:
a first yoke yokingly connecting the secondary cylinder to the primary piston; and
a second yoke yokingly connecting the secondary piston to the primary cylinder; and
wherein the float is connected to at least one of the secondary cylinder and the primary piston; and
wherein the anchor is connected to at least one of the secondary piston and the primary cylinder.

20. The apparatus of claim 11, in which the interconnection means comprises:
a first yoke yoking the secondary piston to the primary cylinder; and
a second yoke yoking the secondary cylinder to the primary piston; and wherein the float is connected to at least one of the secondary piston and the primary cylinder; and
wherein the anchor is connected to at least one of the secondary cylinder and the primary piston.

21. The apparatus of claim 12:
wherein the primary and secondary piston pumps are arranged in series so that the primary and secondary cylinders are positioned cylinder end to cylinder end between the float and anchor.

22. The apparatus of claim 21:
wherein the float is connected to at least one of the primary piston and the secondary piston; and
wherein the anchor is connected to at least one of the primary cylinder and the secondary cylinder.

23. The apparatus of claim 22, in which the interconnection means comprises:
a piston yoke yoking the primary piston to the secondary piston; and
a cylinder yoke yoking the primary cylinder to the secondary cylinder; and
wherein the float is connected to the primary piston; and wherein the anchor is connected to the secondary cylinder.

24. The apparatus of claim 22, in which the interconnection means comprises:
a piston yoke yoking the primary piston to the secondary piston; and
a cylinder yoke yoking the primary cylinder to the secondary cylinder; and
wherein the float is connected to the secondary piston; and
wherein the anchor is connected to the primary cylinder.

25. The apparatus of claim 21:
wherein the float is connected to at least one of the primary cylinder and the secondary cylinder; and
wherein the anchor is connected to at least one of the primary piston and the secondary piston.

26. The apparatus of claim 25, in which the interconnection means comprises:
a piston yoke yoking the primary piston to the secondary piston; and
a cylinder yoke yoking the primary cylinder to the secondary cylinder; and
wherein the float is connected to the primary cylinder; and
wherein the anchor is connected to the secondary piston.

27. The apparatus of claim in which the interconnection means comprises:
a piston yoke yoking the primary piston to the secondary piston; and
a cylinder yoke yoking the primary cylinder to the secondary cylinder; and
wherein the float is connected to the secondary cylinder; and
wherein the anchor is connected to the primary piston.

28. The apparatus of claim 12:
wherein the primary and secondary piston pumps are generally concentrically and generally coaxially arranged between the float and the anchor so that one of the primary or secondary piston pump is at least partially contained within the other of the primary or secondary piston pump.

29. The apparatus of claim 28:
wherein the secondary piston pump is at least partially contained within the primary piston pump.

30. The apparatus of claim in which the interconnection means comprises:
- a cylinder yoke yoking the primary cylinder to the secondary cylinder;
- a piston yoke yoking the primary piston to the secondary piston; and
- wherein the float is connected to at least one of the primary piston and the secondary piston; and
- wherein the anchor is connected to at least one of the primary cylinder and the secondary cylinder.

31. The apparatus of claim 28, in which the interconnection means comprises:
- a cylinder yoke yoking the primary cylinder to the secondary cylinder;
- a piston yoke yoking the primary piston to the secondary piston; and
- wherein the float is connected to at least one of the primary cylinder and the secondary cylinder; and
- wherein the anchor is connected to at least one of the primary piston and the secondary piston.

* * * * *

UNITED STATES PATENT AND TRADEMARK OFFICE
CERTIFICATE OF CORRECTION

PATENT NO. : 4,883,411
DATED : November 28, 1989
INVENTOR(S) : Tom J. Windle

It is certified that error appears in the above-identified patent and that said Letters Patent is hereby corrected as shown below:

IN THE ABSTRACT:

Line 2, "failing" should be --falling--.

Column 3, line 1, "ar" should be --are--;

Column 3, lines 62 and 63, "2S" should be --28--;

Column 5, line 4, "4S" should be --48--;

Column 5, line 61, "2S" should be --28--;

Column 7, line 52, "S7" should be --87--;

Column 9, line 55, "S6" should be --86--;

Column 10, lines 26, 38, and 67, "S8" should be --88--;

Column 12, line 46, "yke" should be --yoke--;

Column 13, line 22, "S1" should be --81--;

Column 14, line 6, "SS" should be --88--; and

Column 17, line 68, after "tether" insert --88--.

IN THE CLAIMS:

Column 24, claim 10, line 12, after "claim" insert --6,--;

UNITED STATES PATENT AND TRADEMARK OFFICE
CERTIFICATE OF CORRECTION

PATENT NO. : 4,883,411

DATED : November 28, 1989

INVENTOR(S) : Tom J. Windle

It is certified that error appears in the above-identified patent and that said Letters Patent is hereby corrected as shown below:

Column 25, claim 20, line 63, "11" should be --16--;

Column 26, claim 27, line 49, after "claim" insert --25,--; and

Column 27, claim 30, line 1, after "claim" insert --28,--.

Signed and Sealed this

Twenty-first Day of May, 1991

Attest:

HARRY F. MANBECK, JR.

*Attesting Officer*　　　　*Commissioner of Patents and Trademarks*